Patented Mar. 15, 1932

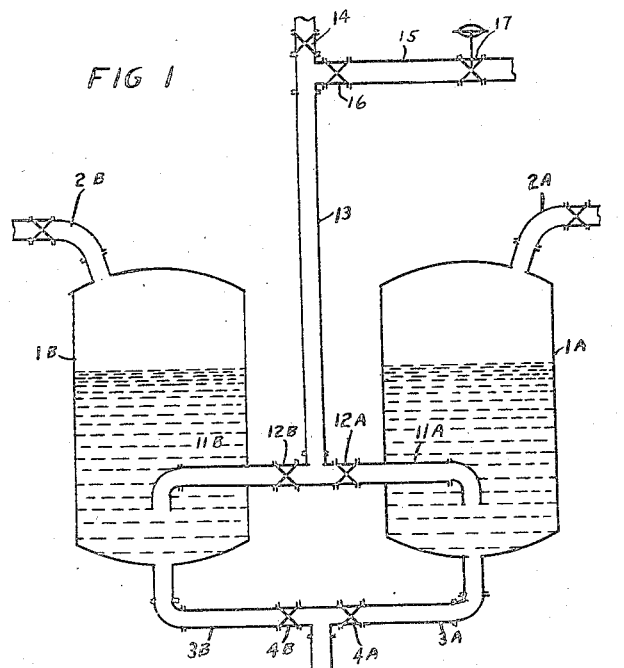
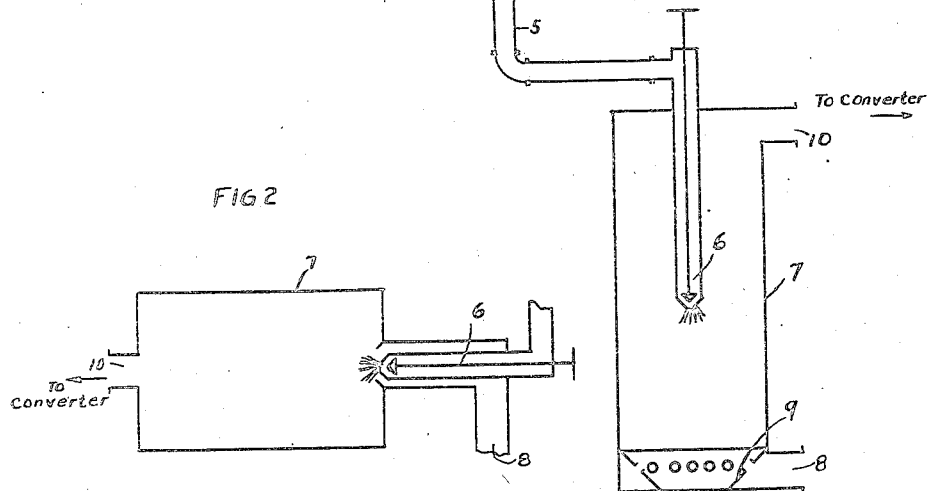

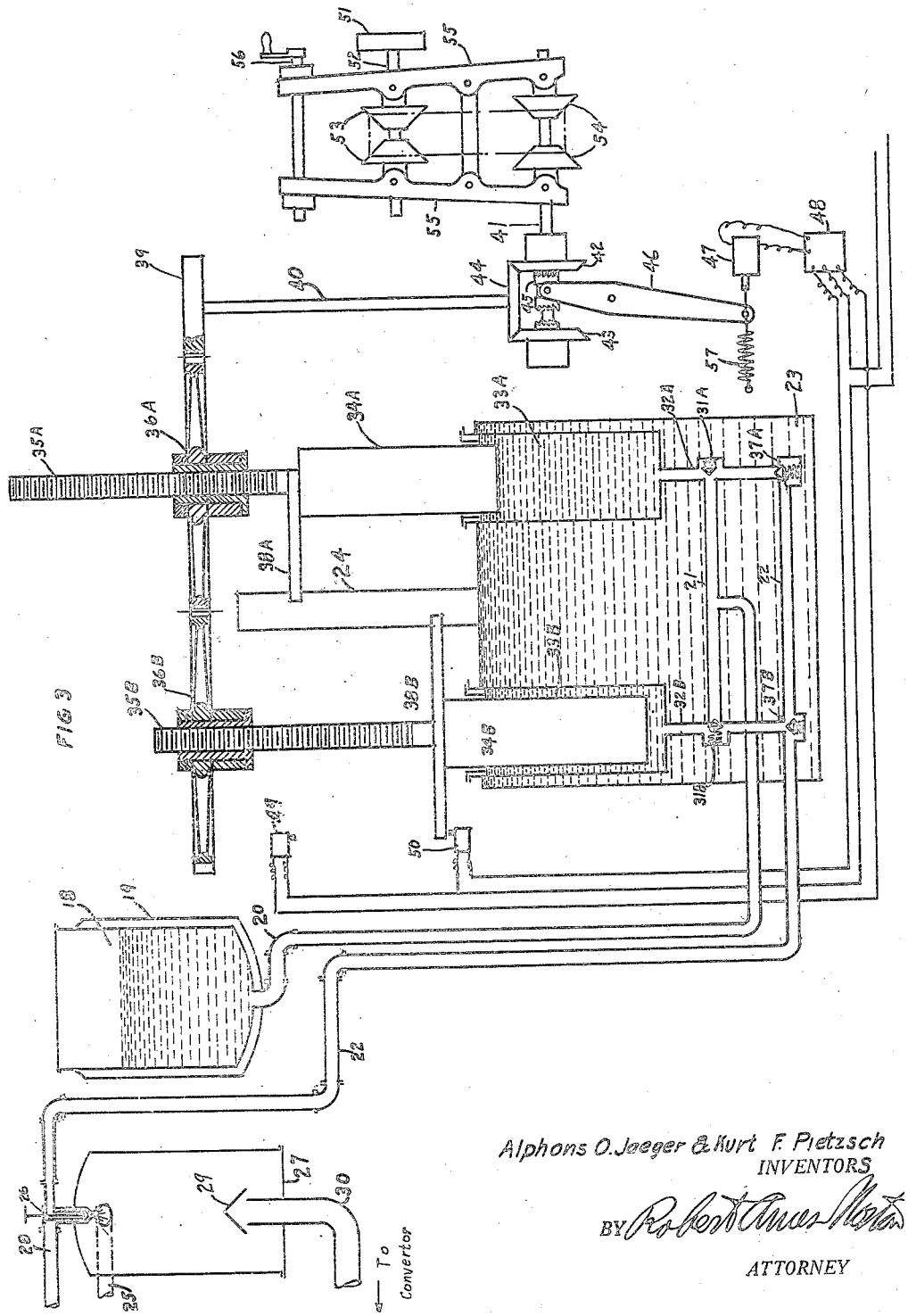

1,849,833

UNITED STATES PATENT OFFICE

ALPHONS O. JAEGER, OF CRAFTON, AND KURT F. PIETZSCH, OF PITTSBURGH, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

METHOD FOR VAPORIZATION IN VAPOR PHASE CATALYSES

Application filed May 31, 1928. Serial No. 281,712.

Vapor phase catalyses, especially the oxidation of organic compounds, involves forming a mixture of the material to be treated with air or other oxidizing gas in the case of oxidations. Since many of the compounds are solids or in some cases high boiling liquids it is frequently difficult to achieve a satisfactory vaporization by the old methods which utilize subliming processes in which hot air or oxidizing gases are passed over the material to be vaporized while the latter is kept at an elevated temperature. By sublimation is meant transformation of a solid or liquid into the vapor phase at a temperature below its boiling point. This method does not give an accurately predetermined mixture of gas and vapor for the vaporization depends on a number of factors which vary during the process. Thus, for example, while it is a relatively simple matter to maintain the temperature of the material to be vaporized fairly constant, it is difficult to maintain its level and exposed surface uniform without elaborate devices and many of the materials are crude mixtures which have a number of components of different vapor pressures. The more volatile constituents vaporize more rapidly so that at first the hot air or gas picks up more vapors and is richer in the relatively more volatile constituents than later on in the process. This is not so serious with liquids, such as benzol, toluol, and the like but it begins to become fairly serious when crude naphthalene is vaporized as, for example, in the catalytic process of producing phthalic anhydride and maleic acid and when crude anthracene is used for preparing anthraquinone or for the catalytic purification of anthracene by selective combustion of impurities, such as carbazol, it is impractical to operate by any process of sublimation as the vapor pressures of the different constituents vary greatly. Even with crude naphthalene the ordinary sublimation method is extremely wasteful for the residue from the sublimation contains large amounts of naphthalene which cannot be recovered satisfactorily.

It is, of course, an impossibility to obtain a uniform composition of vapors where such a product as crude naphthalene, crude acenaphthene, crude phenanthrene, or crude anthracene is vaporized.

Another disadvantage of the methods used in the past for vaporizing consists in the fact that it is difficult to maintain an exactly uniform temperature and speed of flow of the air or other oxidizing gas used to pick up the vapors, and in the past no accurate control of the vapor composition has been possible and not only have there been great wastes in unsublimable residue but the process has been poorly controlled owing to the fluctuations in compositions of the reacting gases.

A further disadvantage of the prior sublimation methods for vaporization lies in the fact that the whole of the mass of material to be sublimed is maintained for long periods of time at a relatively high temperature. Many of the substances tend to polymerize or contain impurities which polymerize or condense. This is particularly true of substances such as acenaphthene. When it is attempted to vaporize these materials by sublimation a considerable proportion is transformed into polymerization or condensation products which are not volatile and introduce a serious loss of material coupled with difficulties in cleaning out the sublimer or vaporizer as many of the polymerization or condensation products are tarry, which are difficult to remove.

The present invention avoids all the disadvantages of the prior methods by delivering predetermined quantities of the whole of the crude material to the gas stream into which it is to be vaporized. The method and apparatus operates simply and reliably and permits exact regulation and continuous maintenance of any predetermined conditions of vapor composition. According to the present invention accurately predetermined measured quantities are delivered to the gas stream by mechanical means which are in no way dependent on the temperature of the material to be sublimed or on the gas stream with which its vapors are to be mixed and in some embodiments the method is also independent of the speed, density, or composition of the gas stream.

For liquids such as benzol, toluol, and the like it is possible to spray into a moving gas stream under constant pressure through an orifice of predetermined size. Where melted solids and particularly high melting non-homogeneous solids, such as crude anthracene, crude acenaphthene, or even crude naphthalene, are used, the present invention provides for mechanically forcing predetermined amounts of material through an orifice into the gas stream, the amounts being positively measured and not depending on speed of flow through the orifice. The latter method may, of course, be used with perfect success with liquids such as benzol or toluol where the somewhat greater accuracy of control obtained is desirable. This method of positive delivery of predetermined measured quantities may, therefore, be considered as the preferred method of the present invention and the apparatus for carrying it out the preferred embodiment of the principles of the invention. The method and apparatus of the present invention may also be effectively applied to the spraying of sulfur into a combustion chamber or sulfur burner in order to produce burner gases in the contact sulfuric acid process.

A few typical embodiments of the invention are illustrated in diagrammatic form in the drawings, in which:

Fig. 1 is a vertical section through a system for delivering a liquid product through an orifice at constant pressure;

Fig. 2 is a detail view of an orifice of different design; and

Fig. 3 is a vertical section through a device for delivering predetermined measured amounts of material to a vaporizing chamber.

In describing the apparatus shown in Figs. 1 and 2, its operation will be described in connection with the formation of a mixture of toluol vapors with air or an oxidizing gas such as mixtures of $CO_2$ and oxygen with or without nitrogen for the catalytic production of benzaldehyde and benzoic acid. It should be understood that the apparatus is equally applicable to other liquids, such as benzol for the production of maleic acid or cyclohexane (by catalytic hydrogenation), methyl alcohol, nitrobenzol (for catalytic reduction to aniline), and the like. The apparatus consists in two toluol tanks 1A and 1B which are provided with valved filling pipes 2A and 2B, exhaust pipes 3A and 3B controlled by valves 4A and 4B. The pipes 3A and 3B join a single pipe 5 which leads to an adjustable nozzle 6 in a vaporizing chamber 7, into which a hot air stream or a hot stream of other oxidizing gas enters through the pipe 8, passing through the perforated vaporizing baffles 9 up against the spray of toluol from the nozzle 6 and out through the exhaust pipe 10. Two pipes 11A and 11B extend into the tanks 1A and 1B respectively having an opening somewhat above the bottom of the tanks. These pipes are controlled by valves 12A and 12B respectively and join to form a pipe 13 which leads to the atmosphere and is provided with a shut-off valve 14. A branch pipe 15 provided with a shut-off valve 16 and a pressure regulating valve 17 joins the pipe 13 between the valve 14 and the T where the pipe joins the pipes 12A and 12B. This pipe 15 leads to a source of compressed air or any other suitable gas under pressure.

In operation the tanks 1A and 1B are filled about two-thirds full as indicated in the drawings and, if desired, they may be provided with suitable heating means, not shown. In fact, the whole apparatus is diagrammatic in nature and suitable heating means or lagging will be applied to the pipes, tanks, vaporizing chamber, and the like, in order to maintain whatever temperature is most suitable for the reaction to be carried out. Heating and lagging means are well known in the art and are not shown in the diagrammatic drawings as their particular structure forms no part of the present invention.

After both of the tanks 1A and 1B are filled the valves in the pipes 2A and 2B are closed, as are the valves 12B and 4B, the valves 12A and 4A are opened and if the flow to the nozzle 6 is to be under atmospheric pressure, the valve 14 is open and the valve 16 is closed. Hot air or oxidizing gas flows in through the pipe 8, up through the vaporizing chamber 7, and out through the pipe 10. Toluol, suitably preheated if desired, flows down through the pipe 3A and 5 into the nozzle 6 where it is sprayed under constant pressure, irrespective of the level in the tank 1A, for since atmospheric pressure is applied to the air in the pipe 11A the latter maintains this same constant pressure on the toluol in the tank 1A at the level of the pipe exit. As the level in the tank falls more air bubbles up through the pipe 11A and maintains the pressure constant. With a given adjustment of the nozzle 6 a constant and uniform flow of toluol will take place through it and the spray encountering the heated air flowing in countercurrent thereto will be rapidly vaporized and a mixture of toluol vapors and oxidizing gas of constant composition will flow out to the converter through the pipe 10 so long as the gas flow is maintained uniform. All of the toluol is sprayed and therefore even if an impure toluol is used the composition of the vapors remains uniform. When the level in the tank 1A has dropped down to or below the level of pipe 11A, valves 4A and 12A are closed and valves 4B and 12B are opened, the flow of toluol then continuing from tank 1B and fresh toluol being caused to flow into the tank 1A by opening the valve in pipe 2A. Of course, in practice, the change over from one tank to the other is just before the level in tank 1A drops below the pipe 11A. Manual valves have been shown and, of course, the regulation will be effected by first opening 4B and 12B and then closing 4A and 12A so as to cause no interruption in the continuous flow. As the pressure conditions in tank 1B are identical with those in tank 1A the flow will continue under the same head and a uniform delivery of toluol from the nozzle 6 will be continuously maintained. Naturally, of course, the change from one tank to another may be effected by automatic valves actuated by floats in the tank through suitable electric relays or by any other means. These automatic change-over arrangements for valves are well known in the art and are not shown in the drawings. The skilled engineer will use the type most suitable for his particular installation.

When it is desired to cause the toluol to spray with greater force than that possible by utilizing atmospheric pressure in the tanks 1A and 1B, this is readily obtained by closing the valve 14 and opening the valve 16, the valve 17 being adjusted to automatically maintain the desired superatmospheric pressure in the pipe 15. The operation, of course, is identical with the exception that the tanks now feed toluol under a higher but continuously maintained pressure. The changing over from one tank to another is, of course, effected in exactly the same manner. The spraying under pressure is desirable when the liquids to be sprayed possess a relatively high viscosity. In such cases the resistance of flow may constitute a fairly large proportion of the gravity head and changes in temperature of the material which would result in changes of viscosity may bring about uneven feeding. Where, however, a fairly high pressure is maintained on the liquid the variations in resistance will be a smaller proportion of the total pressure and a more uniform feed may, therefore, be obtained.

A somewhat better spraying is effected in the modified vaporizing chamber construction shown in Fig. 2 where like parts are given the same reference characters. It will be apparent that in the modified structure the inlet air or oxidizing gas surrounds the spray nozzle and, therefore, helps to atomize the sprayed toluol. A considerably greater amount of spray is obtained for the same pressure on the nozzle 6 as the venturi effect of the gases flowing around the nozzle through the pipe 6 aids in increasing the size of the spray. The toluol in the nozzle is somewhat more effectively preheated as it encounters the hot gases before the latter have been cooled by vaporization of toluol as in the construction of vaporizing chamber shown in Fig. 1. The proper design of vaporizing chamber chosen by the chemical engineer in any particular case will depend on the particular conditions of the installation.

While it is possible to use the method of apparatus illustrated in Figs. 1 and 2 for the vaporization of low melting solids when suitably heating means are provided, this is not feasible with many. Naphthalene can be handled in the device shown in Figs. 1 and 2 with fair satisfaction, particularly if it is not too dirty, but anthracene, especially crude anthracene, crude and purified acenapthene and even naphthalene can be more effectively vaporized in a system such as that shown in Fig. 3 where positively predetermined, measured quantities of material are sprayed per unit time into the vaporizing chamber. The operation of Fig. 3 will, therefore, be described in connection with the vaporization of crude anthracene for which purpose it is particularly suited although equally efficient for the vaporization of naphthalene, acenaphthene, etc. Essentially, the apparatus consists in a vaporizing chamber 27 provided with a gas inlet 28 and auxiliary gas inlet 25, gas outlet 30 with vaporizing baffle 29 covering the outlet. A spray nozzle 26 is also provided. In order to deliver molten crude anthracene in predetermined quantities through the nozzle 26 into the air stream flowing into the air pipes 25 and 28, crude anthracene is melted in the tank 18 provided with any suitable heating means, such as, for example, oil jacket 19, and flows down through a pipe 20 which may also advantageously be jacketed or lagged in any suitable manner. In general it should be understood that pipes in this figure should be heat insulated or heated; they are shown bare for the sake of simplicity as the particular lagging or jacketing design forms no part of the present invention and such designs are well known in the art. The molten crude anthracene flows out through the pipe 20 into a pipe 21 through valves 31A and 31B respectively into pipes 32A and 32B which lead into the pump cylinders 33A and 33B provided with pistons 34A and 34B. These pistons operate alternately and are raised and lowered by screw threaded shafts 35A and 35B passing through threaded hubs of gears 36A and 36B which turn in opposite directions, being meshed with each other. The pipes 32A and 32B enter a pipe 22 through valves 37A and 37B, which pipe leads to the nozzle 26. Both pump cylinders are surrounded by a casing 23 which may be heated with steam, oil, or any other suitable means and a guide 24 rises from the casing, guiding extensions 38A and 38B on the shafts 35A and 35B respectively. The gears 36A and 36B are driven by a pinion 39 on a shaft 40, which in turn is driven from a shaft 41 through bevel gears 42, 43, and 44, the gears 43 and 42 turning freely on the shaft 41 and being adapted to alternately rotate therewith through the movable dog clutch member 45 which is keyed to the shaft 41 and which can alternately engage with dogs on the bevel pinions 42 and 43. The longitudinal movement of the clutch is effected by a pivoted lever 46 actuated against spring pressure by the solenoid 47 which is operated through the relay 48 connected to the limit switches 49 and 50 which in turn are engaged by the projection 38B on the shaft 35B. Power for turning the shaft 41 is received from any suitable source of unidirectional power through the pulley 51 which turns the shaft 52 provided with keyed, but longitudinally movable, cone members 53. A similar pair of cone members are keyed to and longitudinally movable on the shaft 41. A belt drive from the pulley formed by the cones 53 drives the pulley formed by the cones 54 and the relative speed ratio of these pulley diameters may be varied by moving the cones on their shafts, which movement is effected by the pivoted pair of frames 55 operated through a hand screw 56. This provides for a variable speed ratio between the shaft 52 and 41.

As the piston 34A rises the molten anthracene in the pipe 21 opens the spring pressed valve 31A and flows up into the cylinder 33A. The drawings show the apparatus at the moment when the piston 34A has reached the top of its movement and correspondingly the piston 34B has reached the bottom of its movement and is about to actuate the limit switch 50. As soon as this switch is actuated the solenoid 47 throws the lever 46 reversing the rotation of the piston 39 and with it, of course, the directions of rotation of the gears 36A and 36B. Piston 34A then begins to slowly descend and piston 34B to ascend. The pressure of the anthracene in the pipe 32A closes the valve 31A and opens the valve 37A so that the anthracene flows through the pipe 22 closing valve 37B and finally is sprayed through the nozzle 26 assisted by the hot air blast through the pipe 28 and if necessary by the auxiliary air blast through pipe 25. While the piston 34A descends the piston 34B ascends and the pressure of the anthracene in the pipe 21 opens the spring valve 31B and causes the anthracene to flow up through the pipe 32B, gradually filling the cylinder 33B as the piston 34B rises. When this cycle is complete and the piston 34 has reached its upper limit it throws the limit switch 49 which deenergizes the solenoid 47 through the relay 48 and the spring 57 throws the lever 46 into the position shown in the drawings whereupon the direction of rotation of the pinion 39 is again reversed and another cycle begins, the piston 34B descending and the piston 34A rising. The automatic valves 31B and 37A are then closed and the valves 31A and 37B opened so that anthracene continues to flow through the pipe 22 into the nozzle 26.

Where a continuous uniform source of power is applied at the pulley 51 variations in the amount of anthracene delivered per unit of time are obtained by varying the ratio between the shaft 52 and 41 by operating the screw 56, but at all times the flow is uniform and positive, the pump delivering measured quantities of anthracene to the nozzle. Where a source of power is available, the speed of which can be readily varied, the speed changing mechanism may be dispensed with, and where a reversible power means such as, for example, a suitable electric motor is available, the reverse gear may also be dispensed with, the limit switches 49 and 50 serving to reverse the direction of the motor. The speed varying means are shown in purely diagrammatic form and any suitable form of drive may be used.

The embodiment shown in Fig. 3 will deliver continuously and positively accurately predetermined measured quantities of molten anthracene per unit time to the vaporizing chamber assuring a perfectly uniform vapor composition which is not subject to fluctuations. It should be noted that in this embodiment, the nozzle 26 is not depended on to regulate the flow and therefore may be made large enough to carry the maximum flow which in turn prevents trouble due to clogging, for despite the fact that in practical operation the crude anthracene is usually subject to a coarse and then a fine straining it is difficult to keep a small orifice from clogging or at least from varying its resistance. Therefore, the embodiment shown in Fig. 3 is of advantage in practical operation where long continued operation without shut-down is of great importance. For this reason even though a material such as naphthalene can be handled with a fair amount of success in the more simple and, of course, much cheaper device shown in Fig. 1, we find that in practice it is more desirable to use the positive premeasured delivery which is assured by the modification shown in Fig. 3.

Where still greater reliability is desired the valves 31A and 31B and 37A and 37B may be positively actuated, for example, by suitable cam movement operated by one of the extensions 38A or 38B. Positively operated electrical valve drives may also be used and may be operated through suitable relays. In fact the whole drawing is diagrammatic in nature and suitable structural modifications and designs may and should be used to meet particular conditions of individual installations.

The method and apparatus in the present invention has been described in detail in connection with the vaporization of toluol and anthracene of various grades of purity, naphthalene, etc. Similarly, of course, other organic compounds, such as phenols, tar phenols, phenanthrene, fluorene, and the like and nitrocompounds of various kinds, atomized of course into an atmosphere of hydrogen instead of air, may also be handled. Aliphatic compounds such as methyl alcohol and the like are also effectively vaporized as are heterocyclic compounds, such as furfurals for producing maleic or mesotartaric acid, and the like. In all cases a uniform vapor composition is obtained and a positive, uniform delivery of material is effected in a simple and reliable manner.

What is claimed as new is:

1. A method of effecting catalytic reactions which comprises introducing polycomponent, normally solid, liquefied material, the components of which are not homologues, into a uniform moving gas stream in uniform, predetermined quantities per unit time, the temperature of the gas stream being such that all of the volatile components of the polycomponent material are substantially vaporized, and passing the reaction mixture thus obtained through a catalytic converter.

2. A method of effecting catlytic reactions, which comprises uniformly forcing predetermined measured quantities of polycomponent, normally solid, liquefied material, the components of which are not homologues, into a uniform moving gas stream by mechanical means other than gas pressure and gravity head alone in uniform, predetermined quantities per unit time, the temperature of the gas stream being such that all of the volatile components of the polycomponent material are substantially vaporized, and passing the reaction mixture thus obtained through a catalytic converter.

3. A method of effecting catalytic reactions, which comprises introducing molten crude anthracene into a uniform moving gas stream in uniform, predetermined quantities per unit time, the temperature of the gas stream being such that all of the volatile components of the polycomponent material are substantially vaporized, and passing the reaction mixture thus obtained through a catalytic converter.

4. A method of vaporizing normally solid, molten material into a gas stream to form a reaction mixture for catalysis, which comprises maintaining a flow of said molten material through an orifice into a uniform moving gas stream, and maintaining such flow under the influence of a uniform pressure so as to produce a uniform discharge, whereby predetermined, measured quantities of material are uniformly and continuously introduced into the moving gas stream, the gas stream being maintained at a temperature sufficient to effect substantially complete vaporization of the volatile components of the material.

Signed at Pittsburgh, Pennsylvania this 25th day of May, 1928.

ALPHONS O. JAEGER.
KURT F. PIETZSCH.